(12) United States Patent
Feller

(10) Patent No.: US 7,515,936 B2
(45) Date of Patent: Apr. 7, 2009

(54) MOBILE TERMINAL DEVICE ALONE AND IN COMMUNICATION SYSTEM

(75) Inventor: Siegfried Feller, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 516 days.

(21) Appl. No.: 10/284,298

(22) Filed: Oct. 31, 2002

(65) Prior Publication Data

US 2003/0083101 A1    May 1, 2003

(30) Foreign Application Priority Data

Oct. 31, 2001    (DE)    ................... 101 53 747

(51) Int. Cl.
*H04B 1/38*    (2006.01)
(52) U.S. Cl. ...................... 455/557; 455/420
(58) Field of Classification Search .............. 455/556.1, 455/557, 554.2, 552.1, 417, 418–420
See application file for complete search history.

(56) References Cited

U.S. PATENT DOCUMENTS

| | | | |
|---|---|---|---|
| 4,972,457 A | | 11/1990 | O'Sullivan |
| 5,446,783 A | * | 8/1995 | May ........................... 455/557 |
| 5,930,719 A | | 7/1999 | Babitch et al. |
| 5,991,639 A | * | 11/1999 | Rautiola et al. .......... 455/414.1 |
| 6,035,214 A | | 3/2000 | Henderson |
| 6,138,036 A | * | 10/2000 | O'Cinneide .................. 455/557 |
| 6,301,488 B1 | * | 10/2001 | Alos et al. ................... 455/557 |
| 6,370,394 B1 | * | 4/2002 | Anttila ........................ 455/417 |
| 6,549,534 B1 | * | 4/2003 | Shaffer et al. ............... 370/355 |
| 6,633,759 B1 | * | 10/2003 | Kobayashi .................. 455/419 |
| 6,795,406 B2 | * | 9/2004 | Kikinis ....................... 370/286 |

FOREIGN PATENT DOCUMENTS

| | | |
|---|---|---|
| DE | 198 11 888 | 9/1999 |
| DE | 199 62 725 | 7/2001 |
| DE | 100 35 216 | 8/2001 |
| WO | 98/52371 | 11/1998 |
| WO | 01/15474 | 3/2001 |
| WO | 01/31930 | 5/2001 |

OTHER PUBLICATIONS

European Search Report of European Application No. 02 02 3157 (mailed Jul. 4, 2005).

* cited by examiner

*Primary Examiner*—Edward Urban
*Assistant Examiner*—Adeel Haroon
(74) *Attorney, Agent, or Firm*—Staas & Halsey LLP

(57) ABSTRACT

A radio interface connects a mobile terminal device to a radio network. The mobile terminal device also has a communication interface for coupling to an external computer device, such as a notebook. The communication interface serves to provide real-time transmission of communication data or communication signals between the computer device and an input/output device of the mobile terminal device.

10 Claims, 1 Drawing Sheet

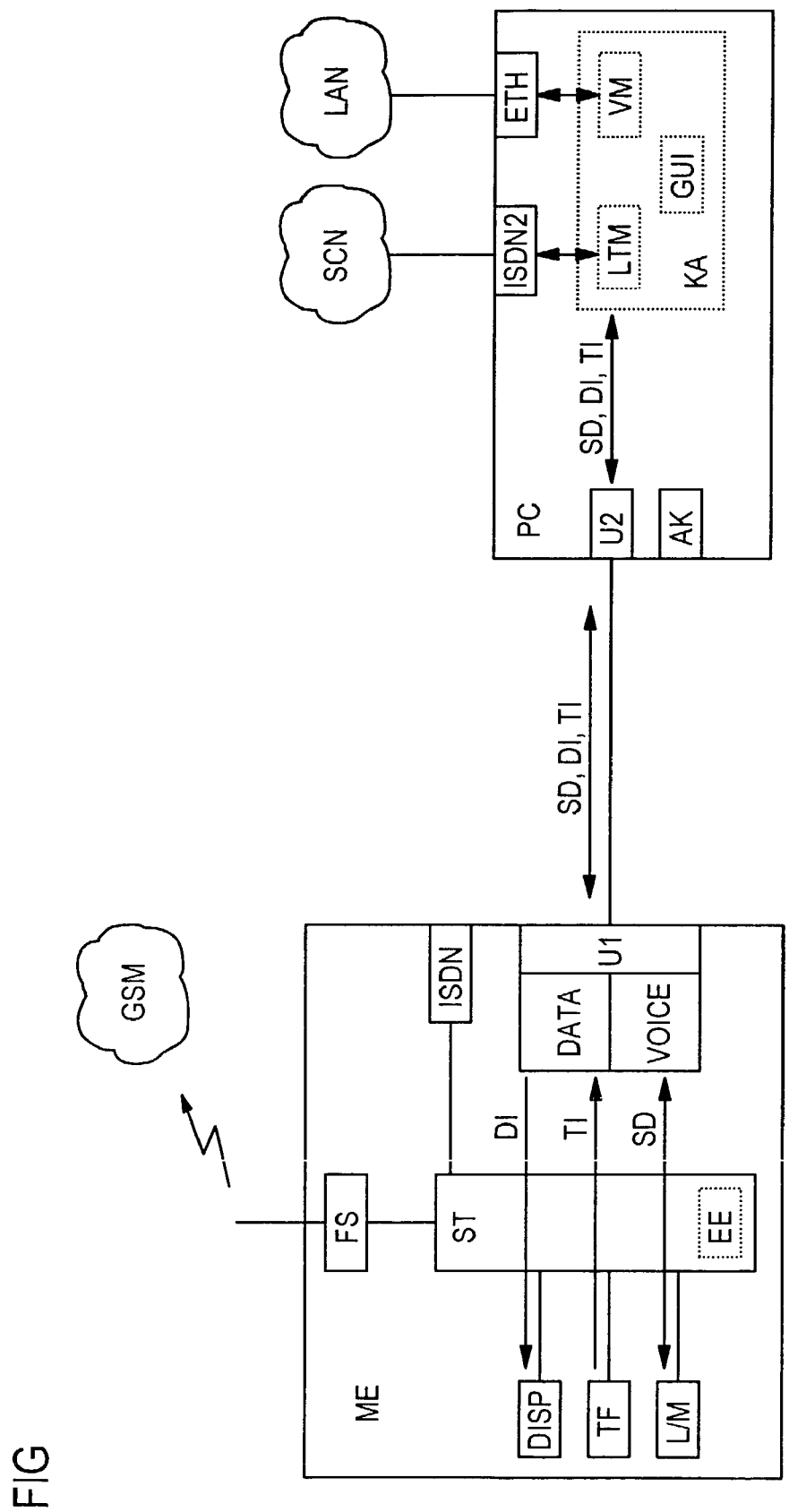
FIG

MOBILE TERMINAL DEVICE ALONE AND IN COMMUNICATION SYSTEM

CROSS REFERENCE TO RELATED APPLICATIONS

This application is based on and hereby claims priority to German Application No. 101 53 747.6 filed on Oct. 31, 2001, the contents of which are hereby incorporated by reference.

BACKGROUND OF THE INVENTION

Existing communication technology presents a number of communication possibilities, particularly using circuit-switched fixed networks, wireless radio networks and packet-oriented data networks, such as LAN (Local Area Networks) or WAN (Wide Area Networks).

To utilize this variety of communication possibilities, a typical user has up until now mostly used separate terminal devices. Usually, these are a mobile terminal device for connecting to a radio network, a stationary telephone terminal for connecting to a circuit-switched, generally public, telephone network, a personal computer for connecting to a packet-oriented data network and occasionally an IP (Internet Protocol) telephone for packet-based telephony via a data network.

However, the use of separate terminal devices in each case makes a terminal-overlapping integration of communication services more difficult and also involves higher procurement costs.

SUMMARY OF THE INVENTION

An object of this invention is to provide a mobile terminal device and a communication system that enables flexible utilization of various communication networks or communication services.

The terminal device according to the invention has a communication interface for coupling to an external computer device, e.g. a personal computer or a notebook. The communication interface serves to provide real-time transmission of communication data or communication signals, e.g. voice, video or multimedia data or signals between the computer device and an input/output device of the mobile terminal device. The input/output device can, for example, be a loudspeaker, a microphone or a different user interface for input/output of communication data or communication signals.

The communication interface for real-time transmission of communication data or communication signals between the mobile terminal device and the computer device enables utilization or control of communication services available on the computer device and of user programs of the mobile terminal device for processing communication data or communication signals.

According to one advantageous development of the invention, the mobile terminal device can have a data interface for coupling to the external computer device and for transmitting display information, keyboard information, dialing information or control information between the computer device and the mobile terminal device. Preferably, the data interface and the communication interface can be based on a common transmission interface, e.g. a USB (Universal Serial Bus) interface. Display information from the computer device can be transmitted via the data interface to the mobile terminal device for indication on its display or from the mobile terminal device to the computer device for display on a graphic user interface of the computer device. Equally, keyboard information originating from a keyboard input at the mobile terminal device, dialing information or control information can be transmitted via the data interface to the computer device for control of a communication application running on the computer. Similarly, keyboard information originating from a keyboard input at the computer device, dialing information or control information from the computer device can be transmitted via the data interface to the mobile terminal device for control purposes. Furthermore, SMS (Short Message Service) data, fax data or other data can be transmitted via the data interface.

According to a further advantageous development, the mobile terminal device can have a transmission device coupled to the radio interface and communication interface for transmission of communication data between the computer device and the radio network. In this way, the computer device can be coupled via the mobile terminal device to the radio network. Preferably, the data interface can also be coupled to the transmission device, to transmit, e.g. SMS data, fax data or other data between the computer device and the radio network.

Furthermore, the mobile terminal device can have a network interface for coupling to a circuit-switched communication network and for real-time transmission of communication data between the mobile terminal device and the circuit-switched communication network. The network interface can in this case, for example, be realized by a control adapter that is integrated into the mobile terminal device or can be plugged in via a plug-in card. The network interface can preferably be designed as an ISDN interface.

A network interface of this kind for coupling to a circuit-switched communication network can also be provided with the computer device. In this case, a communication application running on the computer device can include a circuit-switching module for real-time transmission of communication data or communication signals between the mobile terminal device and the circuit-switched communication network.

Furthermore, the computer device can have a data packet interface, e.g. in the form of an Ethernet network card, for coupling to a packet-oriented communication network, such as a LAN or a WAN. In this case, a communication application running on the computer device can include a packet switching module, e.g. according to ITU-T recommendation H.323, for converting communication data originating from the mobile terminal device or communication signals into data packets and for transmission of the data packets to the packet-oriented communication network.

A data package interface of this kind for coupling to a packet-oriented communication network can also be integrated into the mobile terminal device or realized as a plug-in module that can be plugged in to it.

According to a further advantageous development of the invention, the mobile terminal device can have an acquisition device to acquire a coupling status of the mobile terminal device and also a control device for switching outgoing communication connections conditional upon the acquired coupling status. In this connection, a coupling status indicates whether an external device is coupled to the mobile terminal device via a particular interface. Thus, an interface coupled to an external device can, conditional upon the acquired coupling status, be selected as the particular interface through which an outgoing communication connection is to be routed. Therefore, outgoing communication connections can, as long as nothing is coupled to the communication interface, be switched via the radio interface into the radio network and, after coupling to the computer device, via the communication interface to the computer device.

BRIEF DESCRIPTION OF THE DRAWINGS

These and other objects and advantages of the present invention will become more apparent and more readily appreciated from the following description of the preferred embodiments, taken in conjunction with the accompanying drawings of which:

The drawing is a block diagram of a communication system with a mobile terminal device coupled to a personal computer.

DETAILED DESCRIPTION OF THE PREFERRED EMBODIMENT

Reference will now be made in detail to the preferred embodiment(s) of the present invention, an example of which is illustrated in the accompanying drawing.

In the drawing, a communication system with a mobile terminal device ME, for example a GSM (Global System for Mobile Communication) telephone that is coupled to a personal computer PC is shown schematically. The personal computer PC in this case is preferably a portable type, e.g. a notebook. The coupling of the mobile terminal device ME and the person computer PC is by a USB (Universal Serial Bus) interface U1 of the mobile terminal device ME, that is coupled to a USB interface U2 of the personal computer PC. The USB interfaces U1 and U2 are common transmission interfaces for the transmission of serial data. In this exemplary embodiment, the USB interfaces U1 and U2 are connected by a plug-in USB cable. As an alternative to the USB interfaces U1 and U2, infrared interfaces or short-range radio modules such as Bluetooth modules can be provided in the mobile terminal device ME and in the personal computer PC as transmission interfaces.

The mobile terminal device ME has a radio interface FS for wireless coupling of the mobile terminal device ME to a radio network GSM. Via the radio network GSM, the mobile terminal device ME can, for instance, be coupled to a public communication network or to a WAN (Wide Area Network), such as the Internet.

As further functional components, the mobile terminal device ME has a loudspeaker/microphone group L/M as an input/output device for voice telephony, a keypad TF and a display DISP. Furthermore, the mobile terminal device ME has a control device ST to which the radio interface FS, the loudspeaker/microphone group L/M, the keypad TF and the display DISP are coupled. In addition, a communication interface VOICE for real-time transmission of communication data and a data interface DATA for transmission of other data are coupled to the control device ST. In this exemplary embodiment, the communication interface VOICE is designed as a voice interface for real-time transmission of voice data. Both the data interface DATA and also the communication interface VOICE are based on the USB interface U1 as a transmission interface to the personal computer PC. Similarly, the personal computer PC also has a communication interface and data interface (not illustrated) based on its USB interface U2.

As an option, the mobile terminal device ME also has an ISDN interface ISDN coupled to the control device ST as a network interface for direct coupling of the mobile terminal device ME to a circuit-switched ISDN communication network. The optional ISDN interface ISDN can be integrated into the mobile terminal device ME or realized as a plug-in card. Preferably, a line-oriented terminal device is emulated by the optional ISDN interface ISDN that, for example, can be realized by a so-called control adapter.

The control device ST has an acquisition device EE, e.g. implemented as a program module, by which the coupling status of the mobile terminal device ME can be acquired. In this exemplary embodiment, the acquisition device EE is used to determine whether a functional contact to a personal computer, in this case PC, is established via the USB interface U1. If such a contact is determined by the acquisition device EE, this activates the control device ST to divert outgoing calls from the mobile terminal device ME via the USB interface U1 to the coupled personal computer, in this case PC. If on the other hand the acquisition device EE does not detect such a contact to a personal computer, outgoing calls from the mobile terminal device ME are routed via the radio interface FS to the radio network GSM.

The personal computer PC has a network card ETH, e.g. an Ethernet card as a data packet interface as well as an ISDN card ISDN2 as a network interface for coupling to a circuit-switched communication network. In this exemplary embodiment the personal computer PC is coupled via the network card ETH to a local area network (LAN) and via the ISDN card ISDN2 to a circuit-switched communication network SCN. The LAN is a packet-oriented communication network based on the Internet protocol. To establish communication connections based on the Internet protocol via the LAN, a communication protocol, e.g. according to the ITU-T recommendation H.323, is additionally implemented. In this connection, real-time connections, such as voice, video or multimedia communication can be considered as communication connections. Such connections are frequently also designated as VoIP (Voice/Video over Internet Protocol) connections and the packet-oriented communication networks on which they are based, i.e. the LAN in this case, as VoIP networks. By the communication protocol based on the Internet protocol, real-time connections, particularly for voice communication between all VoIP-capable terminal devices coupled to the LAN can be established. The LAN is preferably coupled to a WAN (not illustrated) such as the Internet, so that VoIP connections can be routed through the WAN.

A communication application KA, e.g. a CTI (Computer Telephony Integration) application is implemented on the personal computer PC. The communication application KA has a circuit-switched module LTM for real-time transmission of communication data as part of the communication connections between the personal computer PC and the circuit-switched communication network SCM via the ISDN card ISDN2. Furthermore, the communication application KA has a packet switching module VM, e.g. a VoIP module according to the ITU-T recommendation H.323, for real-time transmission of communication data in the form of data packets between the personal computer PC and the LAN via the network card ETH. Furthermore, the communication application KA has a graphic user interface GUI through which the communication application KA can be controlled by the user.

In this exemplary embodiment, outgoing calls from the mobile terminal device ME are, due to the detection by the acquisition device EE of the coupling of the personal computer PC to the mobile terminal device ME, routed via the personal computer PC instead of via the radio interface FS.

A call is initiated on the mobile terminal device ME by a user input on the keypad TF. Based on the user input, keyboard information TI, e.g. control or dialing information, is transmitted from the keypad TF via the control device ST and the data interface DATA to the communication application KA of the personal computer PC. Consequently, the communication application KA activates, conditional upon the received keyboard information TI, the establishment of a communication connection via the circuit-switched module LTM to the circuit-switched communication network SCN or via the packet switched module VM to the LAN, to a connection target in each case identified by the keyboard information TI. At the same time, information on the communication connection to be established, in the form of a display information DI, is transmitted from the communication application KA via the USB interface U2 to the mobile terminal device ME. The control device ST of the mobile terminal device ME receives the display information DI via the data interface DATA and transmits the display information DI to the display DISP for display. The display information DI can also preferably be displayed via the graphic user interface GUI.

After establishment of the communication connection, the voice data SD to be transmitted through the connection in real time is transmitted between the loudspeaker/microphone group L/M and a connection target in each case in the circuit-switched communication network SCN or in the LAN. The transmission takes place via the control device ST, the communication interface VOICE, the USB interfaces U1 and U2, the communication application KA and the ISDN card ISDN2 or the network card ETH. In addition to the voice data SD, other types of communication data such as video or multimedia data can also be transmitted through the communication connection via the voice communication interface VOICE between the mobile terminal device ME and the personal computer PC.

Coupling a mobile terminal device ME and personal computer PC according to the invention enables control (dialing, lifting, replacing etc.) of a connection switched and managed from the personal computer PC to also be effected, as usual, from the mobile terminal device ME. By transmitting the voice data SD between the personal computer PC and the loudspeaker/microphone group L/M, the mobile terminal device can as it were be used as a telephone receiver for the personal computer PC. The use of the mobile terminal device ME as a telephone receiver for the personal computer PC has the particular advantage compared with using a loudspeaker/microphone group (not illustrated) built in to the personal computer PC that ambient noise has a substantially less disturbing effect when telephoning.

As a simpler alternative to coupling by the USB interfaces U1 and U2, the mobile terminal device ME can also be connected by a cable to the audio card AK of the personal computer. In this case, analog voice signals can be transmitted directly between the loudspeaker/microphone group L/M and the audio card AK. The audio card AK then converts between analog voice data of the loudspeaker/microphone group L/M and digital voice data of the communication application KH.

The coupling between the mobile terminal device ME and personal computer PC can also serve to establish a communication or data link from the personal computer PC to the radio network GSM and, if necessary, from there also to the Internet. The data to be transmitted in this case is switched by the control device ST between the radio interface FS and the data interface DATA or the communication interface VOICE. In this way, SMS data, fax data or other data can also be transmitted between the radio network GSM and personal computer PC.

By the invention, access to a radio network and also to a circuit-switched communication network and to a packet-switched communication network can be integrated in a single terminal device, i.e. the mobile terminal device according to the invention in conjunction with a personal computer.

As long as the mobile terminal device ME is not coupled to the personal computer PC, it is possible to make wireless telephone calls using the mobile terminal device via the radio network GSM. After connection to the personal computer PC, the mobile terminal device ME optionally allows both stationary telephoning via the circuit-switched communication network SCN and VoIP telephony via the LAN. Coupling the mobile terminal device ME and personal computer PC also enables the personal computer PC to be coupled to the radio network GSM and through this to the Internet, independent of stationary communication networks. The combination according to the invention of the mobile terminal device and personal computer thus covers the most important types of communication. The present stationary fixed telephone which is still common is thus actually no longer necessary.

The invention has been described in detail with particular reference to preferred embodiments thereof and examples, but it will be understood that variations and modifications can be effected within the spirit and scope of the invention.

What is claimed is:

1. A mobile terminal device capable of communication over a radio network via a radio interface and connection to an external computer device, comprising:
   an input/output device;
   a control device executing user programs for processing communication data or communication signals and controlling the user programs on the mobile terminal device and a communication connection to an external network on the computer device;
   a communication interface for coupling to the external computer device and for real-time transmission of at least one of voice data and communication signals between the computer device and said input/output device, and between the external network and the input/output device via the computer device; and
   a data interface for coupling to the external computer device and for transmitting display information to be displayed at the mobile terminal device and keyboard information, dialing information, and control information for controlling a CTI-application running on the external computer device, between the mobile terminal device and the computer device.

2. A mobile terminal device according to claim 1, further comprising a data interface for coupling to the external computer device and for transmitting at least one of display information, keyboard information, dialing information and control information between the computer device and the mobile terminal device.

3. A mobile terminal device according to claim 2, wherein said data interface and said communication interface utilize a common transmission interface for coupling to the external computer device.

4. A mobile terminal device according to claim 3, further comprising a transmission control device coupled to the radio interface and said communication interface for transmission of the communication data between the computer device and the radio network.

5. A mobile terminal device according to claim 4, further capable of connection to a circuit-switched communication network, and
   further comprising a network interface for coupling to the circuit-switched communication network and for real-time transmission of the voice data between the mobile terminal device and the circuit-switched communication network.

6. A mobile terminal device according to claim 5, further comprising:

an acquisition device for acquiring a coupling status of the mobile terminal device; and a switching control device for switching outgoing communication connections conditional upon the acquired coupling status.

7. A communication system using a radio network, comprising:

a mobile terminal device, including
a radio interface for communication with the radio network,
a control device executing user programs for processing communication data or communication signals and controlling the user programs and a communication connection to an external network on a computer device;
a communication interface; and
a data interface for coupling to the computer device and for transmitting display information to be displayed at the mobile terminal device and keyboard information, dialing information, and control information for controlling a CTI-application running on the computer device, between the mobile terminal device and the computer device; and
the computer device having a communication application for switching communication connections and for real-time transmission of at least one of voice data and communication signals between said computer device and said mobile terminal device via the communication interface, and between the external network and the mobile terminal device via the computer device.

8. A communication system according to claim 7, wherein the communication system further uses a circuit-switched communication network,
wherein said computer device includes a network interface for coupling to the circuit-switched communication network, and
wherein the communication application includes a circuit-switching module for real-time transmission of at least one of the voice data and the communication signals between the mobile terminal device and the circuit-switched communication network.

9. A communication system according to claim 8, wherein the communication system further uses a packet-oriented communication network,
wherein said computer device further includes a data packet interface for coupling to the packet-oriented communication network, and
wherein the communication application further includes a packet-switching module for converting at least one of the voice data originating from the mobile terminal device and the communication signals into data packets and for transmission of the data packets to the packet-oriented communication network.

10. A mobile terminal device capable of communication over a radio network via a radio interface and connection to an external computer device, comprising:

an input/output device;
a communication interface for controlling a communication connection to an external network and user programs on the external computer device and for real-time transmission of at least one of voice data and communication signals between the computer device and said input/output device, and between the external network and the input/output device via the external computer device;
a control device coupled to the radio interface and said communication interface for transmission of the communication data between the computer device and the radio network; and
a data interface for coupling to the external computer device and for transmitting display information to be displayed at the mobile terminal device and keyboard information, dialing information, and control information for controlling a CTI-application running on the external computer device, between the mobile terminal device and the computer device.

* * * * *